United States Patent
Cobb et al.

(10) Patent No.: US 10,809,691 B2
(45) Date of Patent: Oct. 20, 2020

(54) SYSTEM AND METHOD FOR ANALYZING LADDER LOGIC FOR A PROGRAMMABLE LOGIC CONTROLLER

(71) Applicant: Honda Motor Co., Ltd., Tokyo (JP)

(72) Inventors: Derrick Cobb, Delaware, OH (US); Ravish Eshwarappa, Powell, OH (US); Noah Ronneberg, Columbus, OH (US); Soumyashree Gad, Philadelphia, PA (US); Jiongqian Liang, Columbus, OH (US); Srinivasan Parthasarathy, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 169 days.

(21) Appl. No.: 15/878,969

(22) Filed: Jan. 24, 2018

(65) Prior Publication Data
US 2019/0227513 A1    Jul. 25, 2019

(51) Int. Cl.
*G06F 17/50* (2006.01)
*G05B 19/05* (2006.01)

(52) U.S. Cl.
CPC .. *G05B 19/056* (2013.01); *G05B 2219/13004* (2013.01); *G05B 2219/13144* (2013.01)

(58) Field of Classification Search
USPC ................. 716/104, 106, 111, 116
See application file for complete search history.

(56) References Cited

U.S. PATENT DOCUMENTS

| | | | |
|---|---|---|---|
| 4,991,076 A | 2/1991 | Zifferer et al. | |
| 5,321,829 A * | 6/1994 | Zifferer | G05B 19/056 |
| | | | 700/18 |
| 5,754,451 A | 5/1998 | Williams | |
| 7,433,801 B2 | 10/2008 | Walacavage et al. | |

(Continued)

FOREIGN PATENT DOCUMENTS

| | | |
|---|---|---|
| CN | 202494921 U | 10/2012 |
| CN | 203838534 U | 9/2014 |

(Continued)

OTHER PUBLICATIONS

Legat, C. et al., "An Approach for Discovering and Analyzing Implicit Architectural Designs in Field Level Automation Software," Institute of Automation and Information Systems, Technische Universitat Muchen, Germany, IECON 2014—10th Annual Conference of the IEEE Industrial Electronics Society (2014), pp. 4889-4895.

(Continued)

*Primary Examiner* — Brian Ngo
(74) *Attorney, Agent, or Firm* — Armstrong Teasdale LLP

(57) ABSTRACT

An analysis system for a logic program for a programmable logic controller (PLC) is provided. The analysis system includes a non-transitory memory and a processor. The processor is configured to receive the logic program and divide it into a plurality of segments. The processor is configured to identify a plurality of features among the plurality of segments. The processor is configured to assign the plurality of features to respective classes. The processor (Continued)

is configured to map the plurality of features to respective data objects corresponding to the respective classes. The processor is configured to write the respective data objects to the non-transitory memory.

20 Claims, 15 Drawing Sheets

(56) References Cited

U.S. PATENT DOCUMENTS

| | | | |
|---|---|---|---|
| 7,590,970 B2 | 9/2009 | Bromley | |
| 7,693,585 B2 | 4/2010 | Kalan et al. | |
| 7,783,370 B2 | 8/2010 | Nixon et al. | |
| 7,831,411 B2 | 11/2010 | Reichard et al. | |
| 8,473,917 B2 | 6/2013 | Weatherhead et al. | |
| 9,083,560 B2 | 7/2015 | Lee et al. | |
| 9,195,224 B2 | 11/2015 | Lloyd | |
| 9,290,193 B1 | 3/2016 | Bamfield et al. | |
| 2007/0164785 A1* | 7/2007 | He | G06F 17/5054 326/41 |
| 2009/0089234 A1* | 4/2009 | Sturrock | G05B 17/02 706/45 |
| 2010/0040285 A1* | 2/2010 | Csurka | G06K 9/00624 382/170 |
| 2012/0083906 A1* | 4/2012 | Weatherhead | G05B 23/0267 700/83 |
| 2013/0123951 A1* | 5/2013 | Daily | G05B 23/0216 700/79 |
| 2015/0248556 A1* | 9/2015 | Sickendick | G06F 21/563 726/23 |
| 2018/0107591 A1* | 4/2018 | Smith | G06F 12/0246 |
| 2018/0349388 A1* | 12/2018 | Skiles | G06F 3/0482 |

FOREIGN PATENT DOCUMENTS

| | | |
|---|---|---|
| WO | 2005107409 | 11/2005 |
| WO | 2005109122 | 11/2005 |

OTHER PUBLICATIONS

Vogel-Heuser, B. et al., "Fault Handling in PLC-Based Industry 4.0 Automated Production Systems as a Basis for Restart and Self-Configuration and Its Evaluation," Journal of Software Engineering and Applications (2016), pp. 1-43.

Fuchs, J. et al., "Identification of Design Patterns for IEC 61131-3 in Machine and Plant Manufacturing," Proceedings of the 19th World Congress, The International Federation of Automatic Control (2014), pp. 6092-6097.

"Robotic Process Automation" EYGM Limited (2015), 16 pgs.

Lucas, M. R. et al., "A Study of Current Logic Design Practices in the Automotive Manufacturing Industry," International Journal of Human-Computer Studies (2003), pp. 725-753.

Lucas, M. R. et al., "Methods of Measuring the Size and Complexity of PLC Programs in Different Logic Control Desig Methodologies," International Journal of Advanced Manufacturing Technologies (2003), 436-447.

Dit, B. et al., "Feature Location in Source Code: A Taxonomy and Survey," Journal of Software Maintenance and Evolution: Research and Practice (2011), pp. 53-94.

Carvalho, N. R. et al., "Writing Programs to Understand Programs," 3rd Symposium on Languages, Applications and Technologies (2014), pp. 19-34.

Cheng, Y., "Algorithm and Intellect Tutoring System Design for Ladder Logic Programming" (2007), 86 pgs.

Rossi, O., "Formal Modeling of Timed Function Blocks for the Automatic Verification of Ladder Diagram Programs," Proc. 4th Int. Conf. Automation of Mixed Processes: Hybrid Dynamic Systems (2000), 6 pgs.

Llgurel, S. et al., "What's the Code? Automatic Classification of Source Code Archives," Proceedings of the Eighth ACM SIGKDD International Conference on Knowledge Discovery and Data Mining (2002), pp. 632-638.

Su, Z., "Automatic Analysis of Relay Ladder Logic Programs," University of California, Berkeley (1997), 27 pgs.

Binkley, D., "Source Code Analysis: A Road Map," Future of Software Engineering (2007), 16 pgs.

Chalon, D. et al., "Software factory for industrial automation: focus on the PLC software quality," SPS IPC Drives Italia Conference (2015), 13 pgs.

Tsiplaki, C. et al., "Experience with Static PLC Code Analysis at Cern," 16th Int. Conf. on Accelerator and Large Experimental Control Systems (2017), pp. 1787-1791.

* cited by examiner

| | [PROGRAM OFFSET] | [MNEMONIC] | [ADDRESS] | [COMMENT] |
|---|---|---|---|---|
| 402 — | 0 | IF_NOT | N0B2 | LS4 ADV |
| 404 — | 1 | LOGICAL_AND | N71A | SERVO MAX ERROR |
| 406 — | 2 | LOGICAL_AND | N0A0 | LS5 RET |
| 408 — | 3 | IF_NOT | A7461 | LS AND SERVO MAX ABN |
| 410 — | 4 | LOGICAL_AND_NOT | M18 | MOP RESET PB |
| | 5 | OR_COMBINE | - | - |
| 412 — | 6 | LOGICAL_AND | M1 | AUTO ON |
| 414 — | 7 | OUTPUT | A7461 | LS AND SERVO MAX ABN |

| CHUNK/ WINDOW | ABS OFFSET | OFFSET OF <PREV> | OFFSET OF <CURRENT> | OFFSET OF <NEXT> | <PREV> | <CURRENT> | <NEXT> |
|---|---|---|---|---|---|---|---|
| 0/0 | - | -1 | -1 | 0 | NULL_PADDING | NULL_PADDING | IF_NOT N0B2 |
| 0/1 | 0 | -1 | 0 | 1 | NULL_PADDING | IF_NOT N0B2 | LOGICAL_AND N714 |
| 0/2 | 1 | 0 | 1 | 2 | IF_NOT N0B2 | LOGICAL_AND N714 | LOGICAL_AND N0A0 |
| 0/3 | 2 | 1 | 2 | 3 | LOGICAL_AND N714 | LOGICAL_AND N0A0 | IF_NOT A7461 |
| 0/4 | 3 | 2 | 3 | 4 | LOGICAL_AND N0A0 | IF_NOT A7461 | LOGICAL_AND _NOT M18 |
| 0/5 | 4 | 3 | 4 | 5 | IF_NOT A7461 | LOGICAL_AND _NOT M18 | OR_COMBINE |
| 0/6 | 5 | 4 | 5 | 6 | LOGICAL_AND _NOT M18 | OR_COMBINE | LOGICAL_AND M1 |
| 0/7 | 6 | 5 | 6 | 7 | OR_COMBINE | LOGICAL_AND M1 | OUTPUT A7461 |
| 0/8 | 7 | 6 | 7 | -1 | LOGICAL_AND M1 | OUTPUT A7461 | NULL_PADDING |
| 0/9 | - | 7 | -1 | -1 | OUTPUT A7461 | NULL_PADDING | NULL_PADDING |

FIG. 4C

| <PREV> OR <CURRENT> OR <NEXT> ADDRESS TYPE COUNTS | | | | | <PREV> OR <CURRENT> OR <NEXT> INSTRUCTION COUNTS | | | | |
|---|---|---|---|---|---|---|---|---|---|
| N | M | A | O | L | IF_NOT | LOGICAL_AND | LOGICAL_AND_NOT | OR_COMBINE | OUTPUT |
| 1 | 0 | 0 | 0 | 0 | 1 | 0 | 0 | 0 | 0 |
| 2 | 0 | 0 | 0 | 0 | 1 | 1 | 0 | 0 | 0 |
| 3 | 0 | 0 | 0 | 0 | 1 | 2 | 0 | 0 | 0 |
| 2 | 0 | 1 | 0 | 0 | 1 | 2 | 0 | 0 | 0 |
| 1 | 1 | 1 | 0 | 0 | 1 | 1 | 1 | 0 | 0 |
| 0 | 1 | 1 | 0 | 0 | 1 | 0 | 1 | 1 | 0 |
| 0 | 2 | 0 | 0 | 0 | 0 | 1 | 1 | 1 | 0 |
| 0 | 1 | 1 | 0 | 0 | 0 | 1 | 0 | 1 | 1 |
| 0 | 1 | 1 | 0 | 0 | 0 | 1 | 0 | 0 | 1 |
| 0 | 0 | 1 | 0 | 0 | 0 | 0 | 0 | 0 | 1 |

FIG. 4D

| BI-GRAM FEATURES <PREV><CURRENT>; <CURRENT><NEXT> | | | | | | COMMENT FEATURES | | |
|---|---|---|---|---|---|---|---|---|
| NULL_PADDING | IF_NOT_LOGICAL_AND | LOGICAL_AND_LOGICAL_AND | LOGICAL_AND_IF_NOT | IF_LOGICAL_OR | IF_LOGICAL_AND | ALM | SOL | ER |
| 1 | 0 | 0 | 0 | 0 | 0 | 1 | 0 | - |
| 1 | 1 | 0 | 0 | 0 | 0 | 2 | 0 | - |
| 0 | 1 | 1 | 0 | 0 | 0 | 3 | 0 | - |
| 0 | 0 | 1 | 1 | 0 | 0 | 3 | 0 | - |
| 0 | 0 | 1 | 1 | 0 | 0 | 3 | 0 | - |
| 0 | 0 | 0 | 0 | 0 | 0 | 2 | 0 | - |
| 0 | 0 | 0 | 0 | 0 | 0 | 2 | 0 | - |
| 0 | 0 | 0 | 0 | 0 | 0 | 2 | 0 | - |
| 0 | 0 | 0 | 0 | 0 | 0 | 2 | 0 | - |
| 0 | 0 | 0 | 0 | 0 | 0 | 1 | 0 | - |

FIG. 4E

| | [PROGRAM OFFSET] | [MNEMONIC] | [ADDRESS] | [COMMENT] | [TOP CLASS] | [SUB CLASS] |
|---|---|---|---|---|---|---|
| | //CHUNK0 | | | | | |
| 402 — | 0 | IF_NOT | NOB2 | LS4 ADV | ALARM CLASS | T (ALARM TRIGGER) |
| 404 — | 1 | LOGICAL_AND | N71A | SERVO MAX ERROR | ALARM CLASS | T (ALARM TRIGGER) |
| 406 — | 2 | LOGICAL_AND | N0A0 | LS5 RET | ALARM CLASS | T (ALARM TRIGGER) |
| 408 — | 3 | IF_NOT | N7461 | LS AND SERVO MAX ABN | ALARM CLASS | A (ALARM LATCH) |
| 410 — | 4 | LOGICAL_AND-NOT | M18 | MOP RESET PB | ALARM CLASS | R (ALARM RESET) |
| | 5 | OR_COMBINE | - | - | ALARM CLASS | G (GENERAL CLASS) |
| 412 — | 6 | LOGICAL_AND | M1 | AUTO ON | ALARM CLASS | O (ALARM POST COND) |
| 414 — | 7 | OUTPUT | N7461 | LS AND SERVO MAX ABN | ALARM CLASS | F (ALARM OUTPUT) |

FIG. 4F

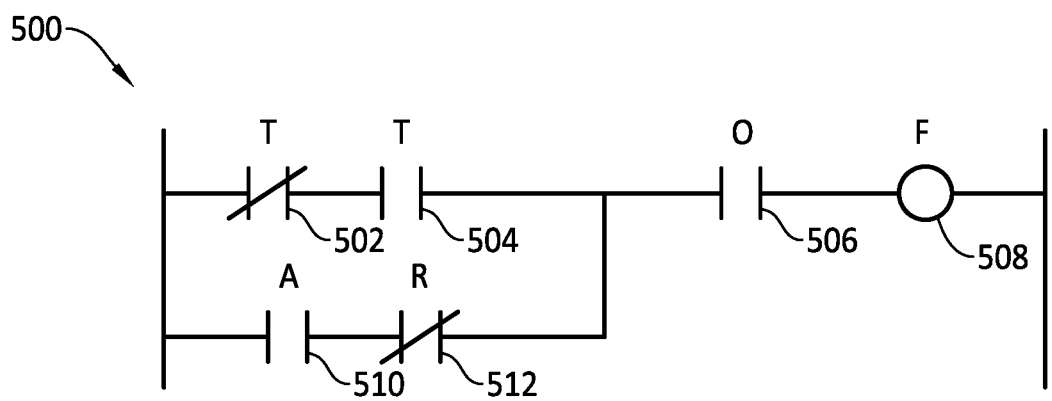

FIG. 5A

| | [PROGRAM OFFSET] | [MNEMONIC] | [ADDRESS] | [COMMENT] |
|---|---|---|---|---|
| 502 | 8 | IF_NOT | NOB5 | NFB3 TRIP |
| 504 | 9 | LOGICAL_AND | N712 | NFB3 TRIP |
| 510 | 10 | IF | A7321 | SUB5 NFB TRIP ABN |
| 512 | 11 | LOGICAL_AND_NOT | M18 | MAIN OP RESET PB |
| | 12 | OR_COMBINE | - | - |
| 506 | 13 | LOGICAL_AND | M1 | MASTER ON PLS |
| 508 | 14 | OUTOUT | A7321 | SUB5 NFB TRIP ABN |

FIG. 5B

| | CHUNK/WINDOW | ABS OFFSET | OFFSET OF <PREV> | OFFSET OF <CURRENT> | OFFSET OF <NEXT> | <PREV> | <CURRENT> | <NEXT> |
|---|---|---|---|---|---|---|---|---|
| | 1/0 | - | -1 | -1 | 0 | NULL_PADDING | NULL_PADDING | IF_NOT N0B5 |
| 502 | 1/1 | 8 | -1 | 0 | 1 | NULL_PADDING | IF_NOT N0B5 | LOGICAL_AND N712 |
| 504 | 1/2 | 9 | 0 | 1 | 2 | IF_NOT N0B5 | LOGICAL_AND N712 | IF A7321 |
| 510 | 1/3 | 10 | 1 | 2 | 3 | LOGICAL_AND N712 | IF A7321 | LOGICAL_AND_NOT M18 |
| 512 | 1/4 | 11 | 2 | 3 | 4 | IF A7321 | LOGICAL_AND_NOT M18 | OR_COMBINE |
| | 1/5 | 12 | 3 | 4 | 5 | LOGICAL_AND_NOT M18 | OR_COMBINE | LOGICAL_AND M1 |
| 506 | 1/6 | 13 | 4 | 5 | 6 | OR_COMBINE | LOGICAL_AND M1 | OUTPUT A7321 |
| 508 | 1/7 | 14 | 5 | 6 | -1 | LOGICAL_AND M1 | OUTPUT A7321 | NULL_PADDING |
| | 1/8 | - | 6 | -1 | -1 | OUTPUT A7321 | NULL_PADDING | NULL_PADDING |

FIG. 5C

| <PREV> OR <CURRENT> OR <NEXT> ADDRESS TYPE COUNTS | | | | | <PREV> OR <CURRENT> OR <NEXT> INSTRUCTION COUNTS | | | | |
|---|---|---|---|---|---|---|---|---|---|
| N | M | A | O | L | IF_NOT | LOGICAL_AND | LOGICAL_AND_NOT | OR_COMBINE | OUTPUT |
| 1 | 0 | 0 | 0 | 0 | 1 | 0 | 0 | 0 | 0 |
| 2 | 0 | 0 | 0 | 0 | 1 | 1 | 0 | 0 | 0 |
| 2 | 0 | 1 | 0 | 0 | 1 | 1 | 0 | 0 | 0 |
| 1 | 1 | 1 | 0 | 0 | 0 | 1 | 1 | 0 | 0 |
| 0 | 1 | 1 | 0 | 0 | 0 | 0 | 1 | 1 | 0 |
| 0 | 2 | 0 | 0 | 0 | 0 | 1 | 1 | 1 | 0 |
| 0 | 1 | 1 | 0 | 0 | 0 | 1 | 0 | 1 | 1 |
| 0 | 1 | 1 | 0 | 0 | 0 | 1 | 0 | 0 | 1 |
| 0 | 0 | 1 | 0 | 0 | 0 | 0 | 0 | 0 | 1 |

FIG. 5D

| BI-GRAM FEATURES <PREV><CURRENT>; <CURRENT><NEXT> | | | | | | COMMENT FEATURES | | |
|---|---|---|---|---|---|---|---|---|
| NULL_ PAD- DING | IF_NOT_ LOGICAL_AND | LOGICAL_ AND_ LOGICAL_ AND | LOGICAL _AND_IF _NOT | IF_LOGICAL_ OR | IF_LOGICAL _AND | ALM | SOL | ER |
| 1 | 0 | 0 | 0 | 0 | 0 | 1 | 0 | - |
| 1 | 1 | 0 | 0 | 0 | 0 | 2 | 0 | - |
| 0 | 1 | 0 | 0 | 0 | 0 | 2 | 0 | - |
| 0 | 0 | 0 | 0 | 0 | 0 | 3 | 0 | - |
| 0 | 0 | 0 | 0 | 0 | 0 | 3 | 0 | - |
| 0 | 0 | 0 | 0 | 0 | 0 | 2 | 0 | - |
| 0 | 0 | 0 | 0 | 0 | 0 | 2 | 0 | - |
| 0 | 0 | 0 | 0 | 0 | 0 | 2 | 0 | - |
| 0 | 0 | 0 | 0 | 0 | 0 | 1 | 0 | - |

FIG. 5E

| [PROGRAM OFFSET] | [MNEMONIC] | [ADDRESS] | [COMMENT] | [TOP CLASS] | [SUB CLASS] |
|---|---|---|---|---|---|
| //CHUNK1 | | | | | |
| 8 | IF_NOT | NOB2 | LS4 ADV | ALARM CLASS | T (ALARM TRIGGER) |
| 9 | LOGICAL_AND | N71A | SERVO MAX ERROR | ALARM CLASS | T (ALARM TRIGGER) |
| 10 | LOGICAL_AND | N0A0 | LS5 RET | ALARM CLASS | T (ALARM TRIGGER) |
| 11 | LOGICAL_AND-NOT | M18 | MOP RESET PB | ALARM CLASS | R (ALARM RESET) |
| 12 | IF_NOT | N7461 | LS AND SERVO MAX ABN | ALARM CLASS | A (ALARM LATCH) |
| 13 | OR_COMBINE | - | - | ALARM CLASS | G (GENERAL CLASS) |
| 14 | LOGICAL_AND | M1 | AUTO ON | ALARM CLASS | O (ALARM POST COND) |

FIG. 5F

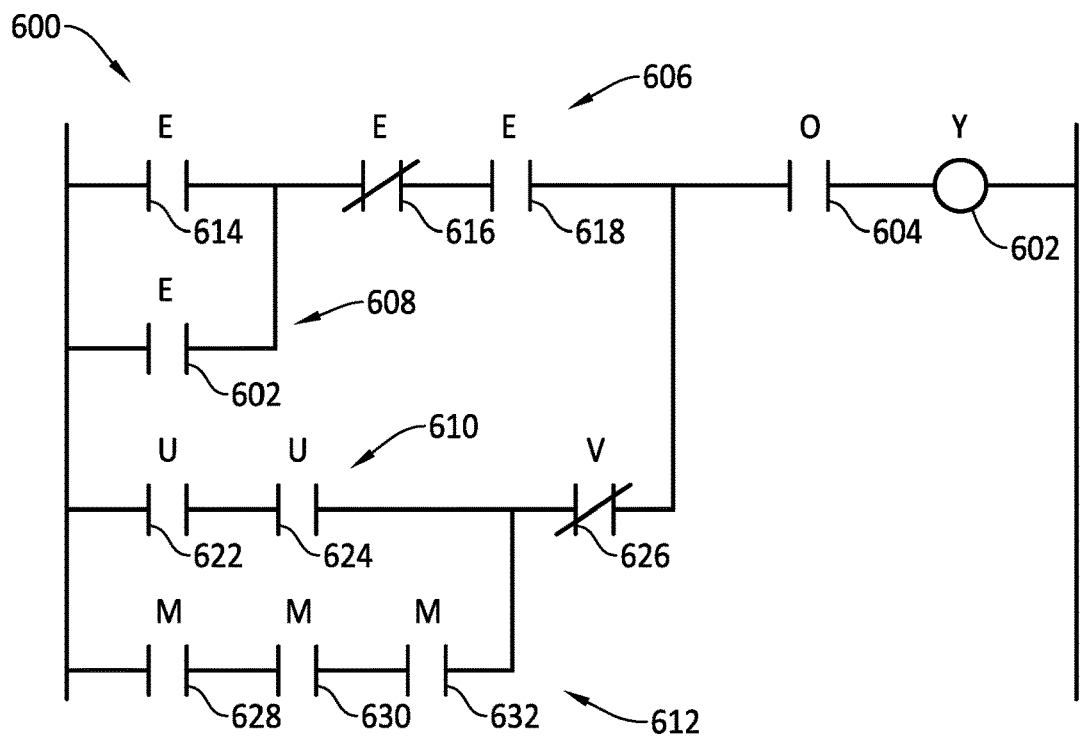

FIG. 6A

| [PROGRAM OFFSET] | [MNEMONIC] | [ADDRESS] | [COMMENT] |
|---|---|---|---|
| 614 — 15 | IF | O382 | SOL A ADV |
| 620 — 16 | LOGICAL_OR | M4 | AUTO ON |
| 616 — 17 | LOGICAL_AND_NOT | O383 | SOL A RET |
| 618 — 18 | LOGICAL_AND | N510 | SOL B ADV |
| 622 — 19 | IF | M1803 | SHIFT C HOME POS |
| 624 — 20 | LOGICAL_AND | L1801 | SHUTTLE 10 ADV POS |
| 628 — 21 | IF | L8 | ROBOT 10B HOME POS |
| 630 — 22 | LOGICAL_AND | M5023 | ROBOT 10A HOME POS |
| 632 — 23 | LOGICAL_AND | M120 | ROBOT 10C I/L 5 |
| 24 | OR_COMBINE | - | - |
| 626 — 25 | LOGICAL_AND_NOT | N91 | MAN/AUTO SSW |
| 26 | OR_COMBINE | - | - |
| 604 — 27 | LOGICAL_AND | M2 | MASTER ON PLS |
| 602 — 28 | OUTPUT | O382 | SERVO A ADV |

FIG. 6B

| CHUNK/WINDOW | ABS OFFSET | OFFSET OF <PREV> | OFFSET OF <CURRENT> | OFFSET OF <NEXT> | <PREV> | <CURRENT> | <NEXT> |
|---|---|---|---|---|---|---|---|
| 2/0 | - | -1 | -1 | 0 | NULL_PADDING | NULL_PADDING | IF_O382 |
| 2/1 | 15 | -1 | 0 | 1 | NULL_PADDING | IF_O382 | LOGICAL_OR M4 |
| 2/2 | 16 | 0 | 1 | 2 | IF_O382 | LOGICAL_OR M4 | LOGICAL_AND_NOT O383 |
| 2/3 | 17 | 1 | 2 | 3 | LOGICAL_OR M4 | LOGICAL_AND_NOT O383 | LOGICAL_AND N510 |
| 2/4 | 18 | 2 | 3 | 4 | LOGICAL_AND_NOT O383 | LOGICAL_AND N510 | IF M1803 |
| 2/5 | 19 | 3 | 4 | 5 | LOGICAL_AND N510 | IF M1803 | LOGICAL_AND L1801 |
| 2/6 | 20 | 4 | 5 | 6 | IF M1803 | LOGICAL_AND L1801 | IF L8 |
| 2/7 | 21 | 5 | 6 | 7 | LOGICAL_AND L1801 | IF L8 | LOGICAL_AND M5023 |
| 2/8 | 22 | 6 | 7 | 8 | IF L8 | LOGICAL_AND M5023 | LOGICAL_AND M120 |
| 2/9 | 23 | 7 | 8 | 9 | LOGICAL_AND M5023 | LOGICAL_AND M120 | OR_COMBINE |
| 2/10 | 24 | 8 | 9 | 10 | LOGICAL_AND M120 | OR_COMBINE | LOGICAL_AND_NOT N91 |
| 2/11 | 25 | 9 | 10 | 11 | OR_COMBINE | LOGICAL_AND_NOT N91 | OR_COMBINE |
| 2/12 | 26 | 10 | 11 | 12 | LOGICAL_AND_NOT N91 | OR_COMBINE | LOGICAL_AND M2 |
| 2/13 | 27 | 11 | 12 | 13 | OR_COMBINE | LOGICAL_AND M2 | OUTPUT O382 |
| 2/14 | 28 | 12 | 13 | -1 | LOGICAL_AND M2 | OUTPUT O382 | NULL_PADDING |
| 2/15 | - | 13 | -1 | -1 | OUTPUT O382 | NULL_PADDING | NULL_PADDING |

FIG. 6C

| | <PREV> OR <CURRENT> OR <NEXT> ADDRESS TYPE COUNTS | | | | | <PREV> OR <CURRENT> OR <NEXT> INSTRUCTION COUNTS | | | | |
|---|---|---|---|---|---|---|---|---|---|---|
| | N | M | A | O | L | IF_NOT | LOGICAL_AND | LOGICAL_AND_NOT | OR_COMBINE | OUTPUT |
| | 0 | 0 | 0 | 1 | 0 | 0 | 0 | 0 | 0 | 0 |
| 614 | 0 | 1 | 0 | 1 | 0 | 0 | 0 | 0 | 0 | 0 |
| 620 | 0 | 1 | 0 | 2 | 0 | 0 | 0 | 1 | 0 | 0 |
| 616 | 1 | 1 | 0 | 1 | 0 | 0 | 0 | 1 | 0 | 0 |
| 618 | 1 | 1 | 0 | 1 | 0 | 0 | 1 | 0 | 0 | 0 |
| 622 | 1 | 1 | 0 | 0 | 1 | 0 | 0 | 0 | 0 | 0 |
| 624 | 0 | 1 | 0 | 0 | 2 | 0 | 1 | 0 | 0 | 0 |
| 628 | 0 | 1 | 0 | 0 | 2 | 0 | 0 | 0 | 0 | 0 |
| 630 | 0 | 2 | 0 | 0 | 1 | 0 | 1 | 0 | 0 | 0 |
| 632 | 0 | 2 | 0 | 0 | 0 | 0 | 1 | 0 | 0 | 0 |
| | 1 | 1 | 0 | 0 | 0 | 0 | 0 | 0 | 1 | 0 |
| 626 | 1 | 0 | 0 | 0 | 0 | 0 | 0 | 1 | 0 | 0 |
| | 1 | 1 | 0 | 0 | 0 | 0 | 0 | 0 | 1 | 0 |
| 604 | 0 | 1 | 0 | 1 | 0 | 0 | 1 | 0 | 0 | 1 |
| 602 | 0 | 1 | 0 | 1 | 0 | 0 | 1 | 0 | 0 | 1 |
| | 0 | 0 | 0 | 1 | 0 | 0 | 0 | 0 | 0 | 1 |

FIG. 6D

| | BI-GRAM FEATURES <PREV><CURRENT>; <CURRENT><NEXT> | | | | | | COMMENT FEATURES | | |
|---|---|---|---|---|---|---|---|---|---|
| | NULL_ PADDING | IF_NOT_ LOGICAL_AND | LOGICAL_ AND_ LOGICAL_ AND | LOGICAL_ AND_IF _NOT | IF_LOGICAL_ OR | IF_LOGICAL _AND | ALM | SOL | ER |
| | 0 | 0 | 0 | 0 | 0 | 0 | 0 | 1 | - |
| 614 | 0 | 0 | 0 | 0 | 1 | 0 | 0 | 1 | - |
| 620 | 0 | 0 | 0 | 0 | 1 | 0 | 0 | 2 | - |
| 616 | 0 | 0 | 0 | 0 | 0 | 0 | 0 | 2 | - |
| 618 | 0 | 0 | 0 | 0 | 0 | 0 | 0 | 3 | - |
| 622 | 0 | 0 | 0 | 0 | 0 | 1 | 0 | 3 | - |
| 624 | 0 | 0 | 0 | 0 | 0 | 1 | 0 | 2 | - |
| 628 | 0 | 0 | 0 | 0 | 0 | 1 | 0 | 3 | - |
| 630 | 0 | 0 | 1 | 0 | 0 | 1 | 0 | 3 | - |
| 632 | 0 | 0 | 1 | 0 | 0 | 0 | 0 | 2 | - |
| | 0 | 0 | 0 | 0 | 0 | 0 | 0 | 2 | - |
| 626 | 0 | 0 | 0 | 0 | 0 | 0 | 0 | 1 | - |
| | 0 | 0 | 0 | 0 | 0 | 0 | 0 | 2 | - |
| 604 | 0 | 0 | 0 | 0 | 0 | 0 | 0 | 2 | - |
| 602 | 0 | 0 | 0 | 0 | 0 | 0 | 0 | 2 | - |
| | 0 | 0 | 0 | 0 | 0 | 0 | 0 | 1 | - |

FIG. 6E

| [PROGRAM OFFSET] | [MNEMONIC] | [ADDRESS] | [COMMENT] | [TOP CLASS] | [SUB CLASS] |
|---|---|---|---|---|---|
| //CHUNK2 | | | | | |
| 15 | IF | O382 | SOL A ADV | SOLENOID CLASS | E (SOLE PRIMARY COND) |
| 16 | LOGICAL_OR | M4 | AUTO ON | SOLENOID CLASS | E (SOLE PRIMARY COND) |
| 17 | LOGICAL_AND_NOT | O383 | SOL A RET | SOLENOID CLASS | E (SOLE PRIMARY COND) |
| 18 | LOGICAL_AND | N510 | SOL B ADV | SOLENOID CLASS | E (SOLE PRIMARY COND) |
| 19 | IF | M1803 | SHIFT C HOME POS | SOLENOID CLASS | D (SOLE AUTO COND) |
| 20 | LOGICAL_AND | L1801 | SHUTTLE 10 ADV POS | SOLENOID CLASS | D (SOLE AUTO COND) |
| 21 | IF | L8 | ROBOT 10B HOME POS | SOLENOID CLASS | M (SOLE MANUAL COND) |
| 22 | LOGICAL_AND | M5023 | ROBOT 10A HOME POS | SOLENOID CLASS | M (SOLE MANUAL COND) |
| 23 | LOGICAL_AND | M120 | ROBOT 10C I/L 5 | SOLENOID CLASS | M (SOLE MANUAL COND) |
| 24 | OR_COMBINE | - | - | SOLENOID CLASS | G (GEN CLASS) |
| 25 | LOGICAL_AND_NOT | N91 | MAN AUTO SSW | SOLENOID CLASS | M (SOLE MANUAL COND) |
| 26 | OR_COMBINE | - | - | SOLENOID CLASS | G (GEN CLASS) |
| 27 | LOGICAL_AND | M2 | MASTER ON PLS | SOLENOID CLASS | O (SOLE POST COND) |
| 28 | OUTPUT | O382 | SERVO A ADV | SOLENOID CLASS | Y (SOLE OUTPUT) |

FIG. 6F

SYSTEM AND METHOD FOR ANALYZING LADDER LOGIC FOR A PROGRAMMABLE LOGIC CONTROLLER

BACKGROUND

The field of the disclosure relates generally to programming for programmable logic controllers (PLCs) and, more particularly, to a system and method for analyzing ladder logic for PLCs.

At least some industrial equipment, such as equipment used in the manufacture of goods, for example, is controlled by one or more PLC. A PLC is a highly-reliable and typically ruggedized long-life computing device for use in controlling automated processes, assembly lines, or robotics, for example. PLCs are generally easily programmable and most in use today utilize some form of ladder logic. Ladder logic is a diagrammatic representation of sequential logic, where each rung includes one or more logic elements arranged on the rung or in branches of the rung, and represents the logical state of actual physical inputs, outputs, and memory of the PLC. PLCs utilize a variety of communication interfaces, including, for example, and without limitation, analog channels, discrete digital channels, serial channels such as RS-232, RS-422, RS-485, universal serial bus (USB), and Ethernet.

Given the long life cycle of industrial equipment and the PLCs that control the equipment, occasional maintenance of the PLC and its programming is common. PLC maintenance is typically conducted by trained technicians or tradesman having a general knowledge of PLCs, but not necessarily detailed knowledge of a given piece of equipment, PLC, or ladder logic program. Consequently, PLC maintenance may introduce a significant reoccurring cost to operating such equipment.

BRIEF DESCRIPTION

In one aspect, an analysis system for a logic program for a programmable logic controller (PLC) is provided. The analysis system includes a non-transitory memory and a processor. The processor is configured to receive the logic program and divide it into a plurality of segments. The processor is configured to identify a plurality of features among the plurality of segments. The processor is configured to assign the plurality of features to respective classes. The processor is configured to map the respective classes to respective data objects corresponding to the respective classes. The processor is configured to write the respective data objects to the non-transitory memory.

In another aspect, a method of generating a human-machine interface (HMI) for a PLC is provided. The method includes receiving a logic program for the PLC and dividing the logic program into a plurality of segments. The method includes identifying a plurality of features among the plurality of segments. The method includes assigning the plurality of features to respective classes. The method includes mapping the respective classes to respective data objects. The method includes generating an HMI based on a template and the map of features.

In yet another aspect, a system for generating a HMI for a PLC is provided. The system includes an analysis system and an HMI device coupled to the analysis system. The analysis system is configured to generate a map of features of a logic program for the PLC. The HMI device is configured to receive the map of features and generate the HMI based on a template and the map of features.

DRAWINGS

These and other features, aspects, and advantages of the present disclosure will become better understood when the following detailed description is read with reference to the accompanying drawings in which like characters represent like parts throughout the drawings, wherein:

FIG. 4C is a graph of segmented mnemonics from the raw mnemonics shown in FIG. 4B;

FIG. 4D is a graph of extracted feature counts from the segmented mnemonics shown in FIG. 4C;

FIG. 4E is another graph of extracted feature counts from the segmented mnemonics shown in FIG. 4C;

FIG. 4F is a graph of classified mnemonics from the logic program shown in FIG. 4A;

FIG. 5A is a schematic diagram of another exemplary chunk of a logic program including an alarm;

FIG. 5B is a graph of raw mnemonics produced by logic program shown in FIG. 5A;

FIG. 5C is a graph of segmented mnemonics from the raw mnemonics shown in FIG. 5B;

FIG. 5D is a graph of extracted feature counts from the segmented mnemonics shown in FIG. 5C;

FIG. 5E is another graph of extracted feature counts from the segmented mnemonics shown in FIG. 5C FIG. 5F is a graph of classified mnemonics from the logic program shown in FIG. 5A;

FIG. 6A is a schematic diagram of yet another exemplary chunk of a logic program including a solenoid;

FIG. 6B is a graph of raw mnemonics produced by logic program shown in FIG. 6A;

FIG. 6C is a graph of segmented mnemonics from the raw mnemonics shown in FIG. 6B;

FIG. 6D is a graph of extracted feature counts from the segmented mnemonics shown in FIG. 6C;

FIG. 6E is another graph of extracted feature counts from the segmented mnemonics shown in FIG. 6C;

FIG. 6F is a graph of classified mnemonics from the logic program shown in FIG. 6A.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

A PLC is generally programmed with a logic program, such as, for example, a ladder logic program including various sequential logic elements. It is realized herein a need exists to reduce time and cost of carrying out maintenance for PLC systems and, more specifically, the logic program. Typically, when a feature, or when one or more logic elements that compose the feature, is added or modified in the logic program, the change is manually worked into the various systems that accompany the PLC, such as, for example, maintenance systems utilizing a human-machine interface (HMI) for real-time and non-real-time monitoring of the PLC. Such maintenance systems are sometimes referred to as HMI devices. In such a maintenance system, the HMI is typically re-engineered each time a change is introduced into the logic program. For example, if a new alarm is introduced to the logic program, the same alarm is then incorporated into the HMI by the same or additional maintenance personnel. It is further realized herein that, although certain aggregator products enable analysis of logic programs to identify additions and modifications, but such products may still require additional time and personnel to incorporate changes into peripheral systems, such as, for example, an HMI provided on a maintenance system.

Embodiments of the present disclosure relate to a system and method for analyzing ladder logic to generate HMI representations for programming PLCs. The system generates HMI displays for organizing conditions, logic elements, inputs, outputs, and alarms, for example. The system described herein analyzes the logic program loaded onto the PLC to learn and model the logic elements of the logic program. The system further analyzes the logic program to segment the logic program, to identify and extract features, to classify the features according to the model, and to map the resultant classes and subordinate classes to corresponding data objects that are exported to a maintenance system for inclusion in the HMI.

Figure 1:
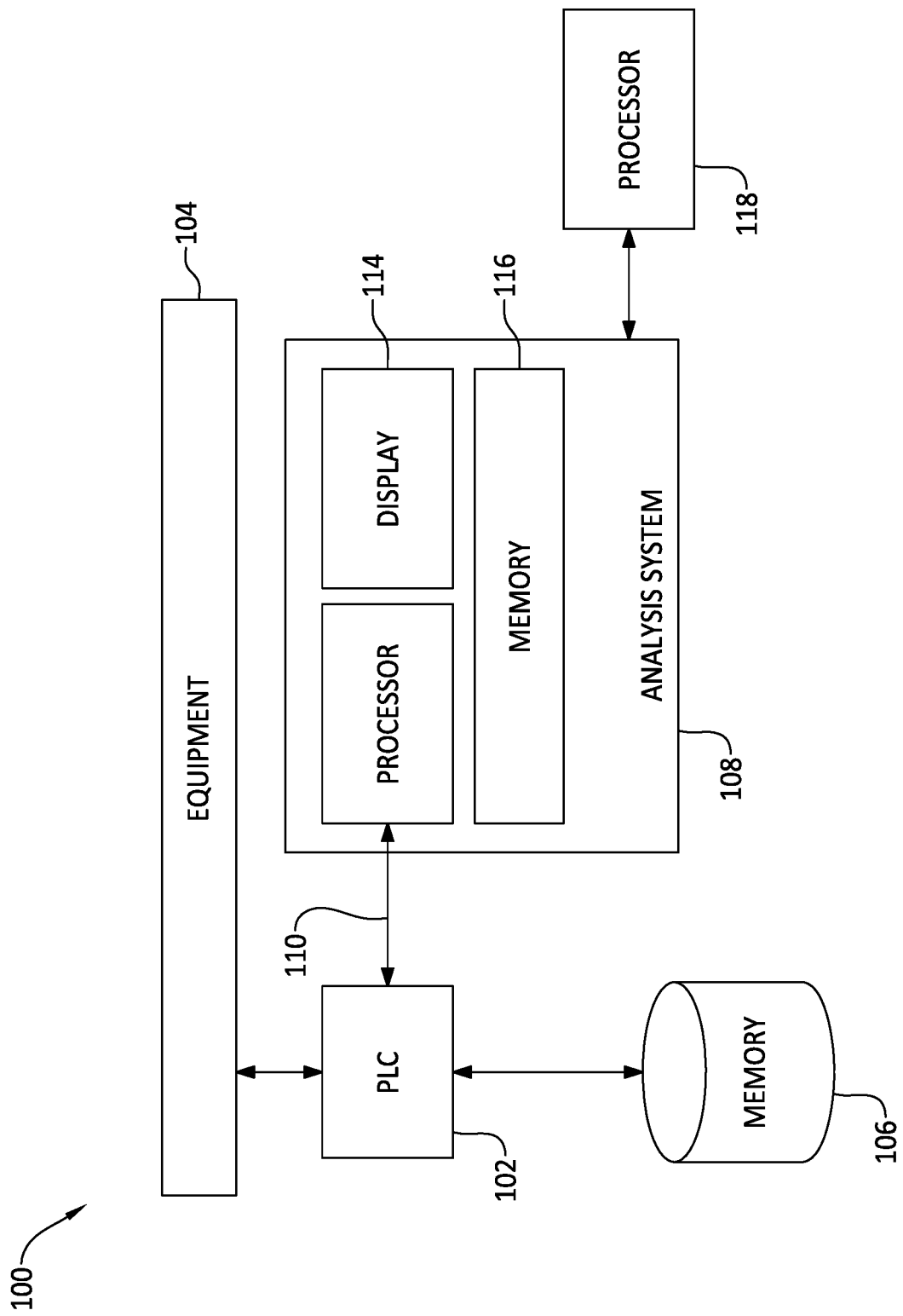
FIG. 1 is a block diagram of an exemplary PLC system.

FIG. 1 is a block diagram of an exemplary PLC system 100. PLC system 100 includes a PLC 102 configured to control equipment 104. PLC 102 is programmed with a logic program and is further coupled to a memory 106 for data storage. In the exemplary embodiment, memory 106 is a non-transitory memory. PLC 102 is coupled to an analysis system 108 via a communication interface 110.

Analysis system 108 includes a processor 112, a display 114, and a memory 116. Memory 116 is a non-transitory memory. Processor 112 is configured to execute program code that analyzes the logic program executed on PLC 102. In certain embodiments, processor 112 is further configured to execute additional program code that defines an HMI that represents PLC 102 and the logic program executed thereon. The HMI includes one or more graphics for display on display 114. In alternative embodiments, PLC system 100 includes an additional HMI device 118 configured to execute program code that defines the HMI and displays the HMI to a user. Such HMI devices may include, for example, a desktop computer, a laptop computer, a tablet computer, a smart phone, or any other suitable computing device for displaying an HMI and enabling input and output from a user.

Figure 2:
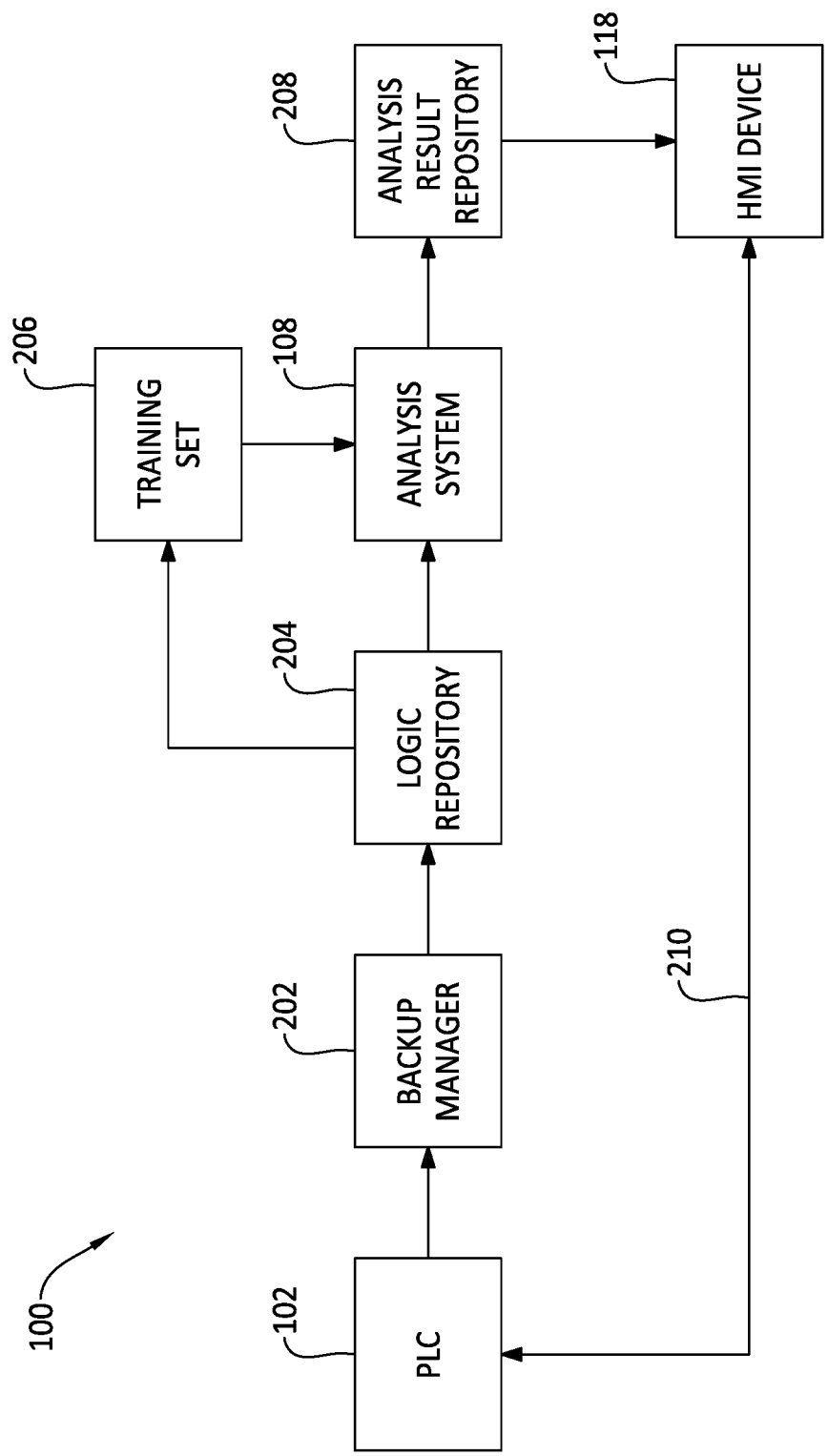
FIG. 2 is a functional block diagram of the PLC system shown in FIG. 1.

FIG. 2 is a functional block diagram of PLC system 100, shown in FIG. 1, including PLC 102, analysis system 108, and HMI device 118. PLC system 100 also includes a backup manager 202, a logic repository 204, a training set 206, and an analysis result repository 208, each of which may be embodied within analysis system 108 or, alternatively, may be embodied in another computing system (not shown) coupled to PLC system 100. PLC 102 is programmed with a logic program that, when executed by PLC 102, controls equipment 104, shown in FIG. 1.

Referring again to FIG. 2, backup manager 202 includes a non-transitory memory, such as, for example, memory 106. Backup manager 202 periodically polls PLC 102 to initiate a backup of data programmed onto PLC 102. Of the data backed up by backup manager 202, the logic program is extracted to logic repository 204. At least a portion of the logic program is used as training set 206 to generate a model for classifying the logic program.

Figure 3:
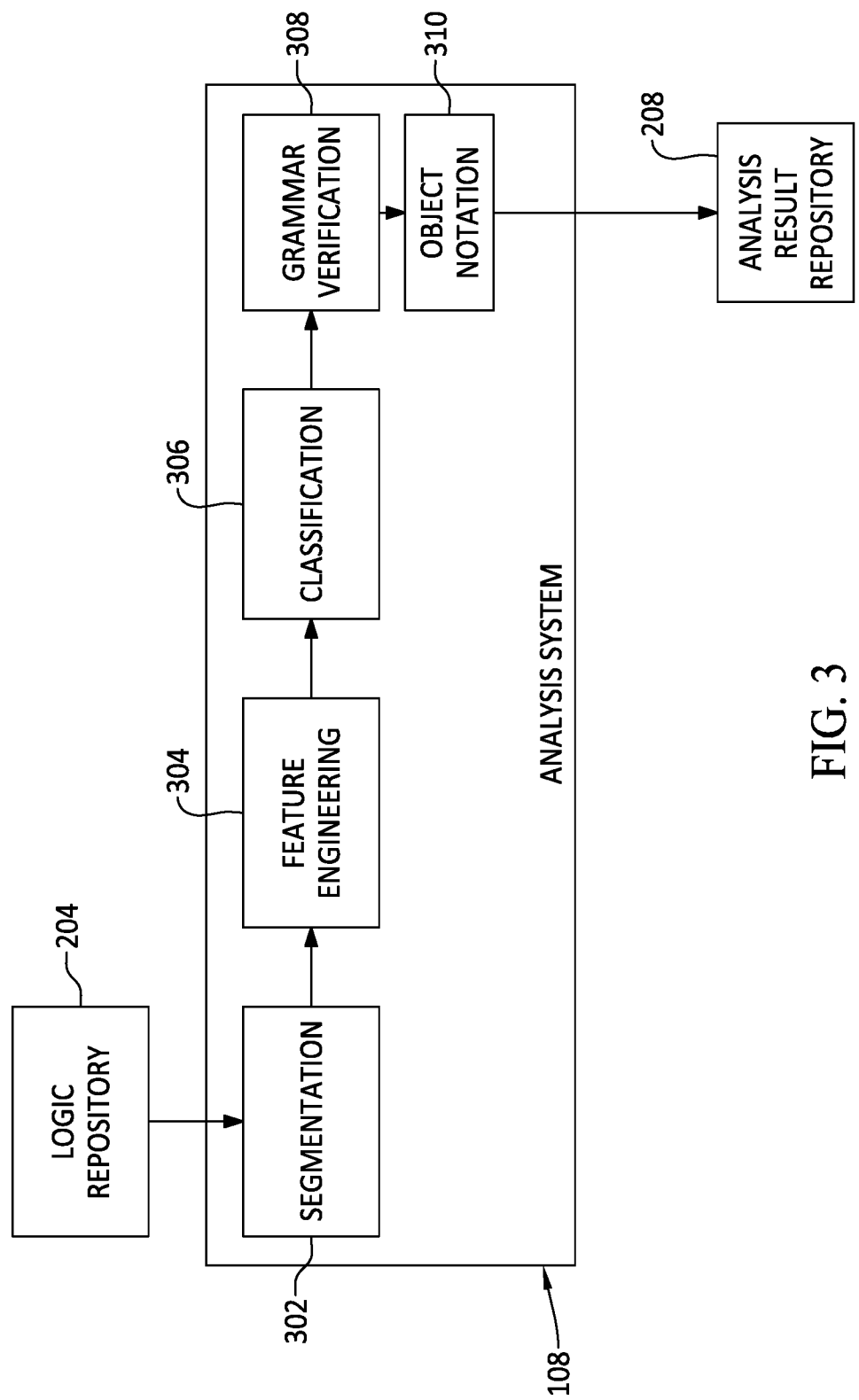
FIG. 3 is a functional block diagram of the analysis system shown in FIGS. 1 and 2.

FIG. 3 is an exemplary functional block diagram of analysis system 108, shown in FIGS. 1 and 2. Analysis system 108 includes several functional program modules configured to be executed by processor 112, including, for example, and without limitation, a segmentation module 302, a feature extraction module 304, a classification module 306, a grammar verification module 308, and an object notation module 310, each of which may be implemented as individual program modules or in combination with any other of the program modules.

Figures 4A, 4B:
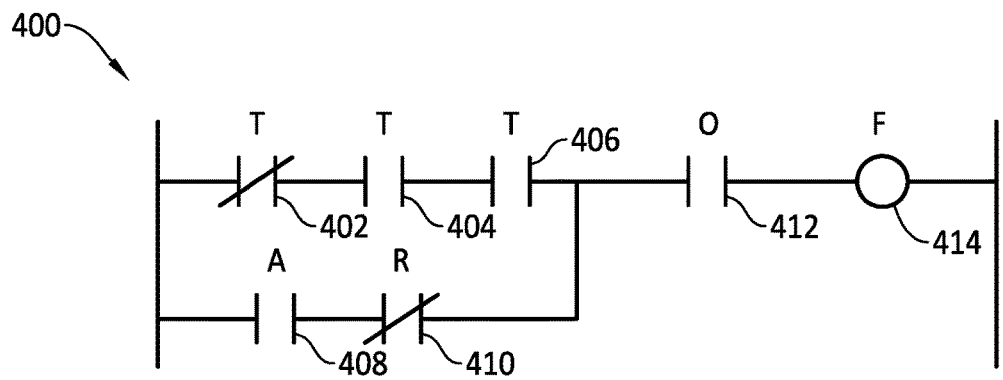
FIG. 4A is a schematic diagram of another exemplary chunk of a logic program including an alarm.
FIG. 4B is a graph of raw mnemonics produced by logic program shown in FIG. 4A.

FIG. 4A is a schematic diagram of an exemplary chunk 400 of a logic program including an alarm. Chunk 400 includes three triggers for the alarm: trigger 402, trigger 404, and trigger 406. Triggers 402, 404, and 406 may include, for example, any combination of sensors and switches to enable the alarm. Trigger 402 is a negated input, e.g., a normally closed switch or button. Conversely, triggers 404 and 406 are conventional logic inputs, e.g., an alarm button or a sensor that detects a physical condition associated with the alarm. Triggers 402, 404, and 406 are arranged in series, which means each of the conditions must be met to actuate the alarm.

Chunk 400 also includes an alarm latch 408, an alarm reset 410, an alarm post-condition 412, and an alarm output 414. Alarm output 414 may include an audible alarm, such as, for example, a siren, a visual alarm, such as, for example, a light or beacon, or a communication that is initiated, such as, for example, transmitting an alarm signal to another computing system. Alarm output 414 may also include an actual solenoid or relay coil that is energized to actuate another alarm system. Alarm latch 408 is logically tied to alarm output 414. When alarm output 414 is actuated, alarm latch 408 latches around triggers 402, 404, and 406. Alarm latch 408 ensures the alarm persists even if the conditions of triggers 402, 404, and 406 are met only momentarily. For example, in a system where triggers 402, 404, and 406 detect a fluid level exceeding a threshold, alarm output 414 is actuated and alarm latch 408 "seals-in" the conditions of triggers 402, 404, and 406. Thus, if the fluid level drops below the alarm threshold, the alarm persists to alert other systems or operators to the occurrence of the fluid level exceeding the threshold.

Alarm latch 408 is broken by alarm reset 410. Alarm reset 410 may include a physical reset button or switch, or may include a digital reset that is engaged by another computing system.

Alarm post-condition 412 is arranged in series with triggers 402, 404, 406, and alarm output 414. Accordingly, alarm post-condition 412 must also be met to actuate the alarm. Notably, alarm post-condition 412 is not latched by alarm latch 408. Consequently, alarm post-condition 412 must be met as long as the alarm persists. Alarm post-condition 412 may include system-level validation logic to verify the alarm is valid. In the system example above, where the alarm guards against excessive fluid levels, alarm post-condition 412 may include a logical check that the system itself is even operating. In another example, alarm post-condition 412 may be a logical check that sensors or other inputs associated with triggers 402, 404, and 406 are operating appropriately, calibrated, and not otherwise malfunctioning. In alternative embodiments, alarm post-condition 412 represents any other condition that should not be latched.

When chunk 400 is processed by classification module 306, classification module 306 recognizes the combination of triggers 402, 404, and 406, for example, with alarm latch 408 and alarm reset 410 to classify chunk 400 as an alarm. The syntax of such an alarm is defined by alpha values assigned to each component. For example, triggers 402, 404, and 406 are assigned the alpha value "T." Alarm latch 408 is assigned the alpha value "A," and alarm reset 410 is assigned the alpha value "R." Alarm post-condition 412 is assigned the alpha value "0," and alarm output 414 is assigned the alpha value "F." Accordingly, the syntax, or "grammar," of the alarm implemented in chunk 400 is "TTTAROF."

FIG. 4B is an example graph of raw mnemonics from exemplary chunk 400 of the logic program including an alarm shown in FIG. 4A. The raw mnemonics are from logic repository 204 and include columns [PROGRAM OFFSET], [MNEMONIC], [ADDRESS], and [COMMENT]. If the mnemonics are from a specific component of exemplary chunk 400, the component is referenced to the left of the corresponding row. If there is no reference to a component of chunk 400, the component of chunk 400 is not specifically called out in chunk 400 and could be a junction of other components of chunk 400, for example. The [PROGRAM OFFSET] column refers to the order in which the mnemonics are read. The [MNEMONIC] column refers to the raw mnemonics that come from the machine for each component of chunk 400. The [ADDRESS] column refers to where in the system the component of chunk 400 is located. The [COMMENT] column refers to an abbreviation of what the component of chunk 400 does.

FIG. 4C is an exemplary product of segmentation module 302. Segmentation module 302 segments the raw mnemonics, shown in FIG. 4B, into chunks and windows, as shown in the CHUNK/WINDOW column. Segmentation module 302 divides the raw mnemonics, shown in FIG. 4B, into chunks by searching the data for statements that include "if" statements and the outputs of the "if" statement. Once an "if" statement and its output are grouped together, the "if" statement and its output are considered to be one chunk. Once the chunks are determined, segmentation module 302 numbers the elements of each chunk in order, as shown in the CHUNK/WINDOW column. Once the segmentation module 302 segments the data into chunks and windows, the ABS OFFSET, OFFSET OF <PREV>, OFFSET OF <CURRENT>, OFFSET OF <NEXT>, <PREV>, <CURRENT>, AND <NEXT> columns are filled in. The ABS OFFSET column refers to the [PROGRAM OFFSET] column, shown in FIG. 4B, and is the order in which the mnemonics that relate to components of chunk 400 are read. The OFFSET OF <CURRENT> column is the position of the components based on the ABS OFFSET column. The OFFSET OF <PREV> column is the number of the OFFSET OF <CURRENT> column for the previous row for each respective row of each component. The OFFSET OF <NEXT> column is the number of the OFFSET OF <CURRENT> column of the next row for each respective row of each component. As FIG. 4C shows, for example, trigger 404 has an ABS OFFSET value of 1 and therefore has an OFFSET OF <CURRENT> value of 1 as well. Since the OFFSET OF <CURRENT> value is 1, the OFFSET OF <PREV> value is 0, and the OFFSET OF <NEXT> value is 2. Values are filled in for these columns of FIG. 4C based on this pattern. The <PREV>, <CURRENT>, and <NEXT> columns of FIG. 4C relate to the previous, current, and next mnemonics and address of each component, and these columns are filled using the raw mnemonics of FIG. 4B. Alarm latch 408, for example, has a raw mnemonic of "IF_NOT" and an address of "A7461," trigger 406 has a raw mnemonic of "LOGICAL_AND" and an address of "N0A0," and alarm reset 410 has a raw mnemonic of "LOGICAL_AND_NOT" and an address of "M18," as FIG. 4B shows. Therefore, in FIG. 4C, the row for alarm latch 408 is populated with "IF_NOT A7461" for the <CURRENT> column, "LOGICAL_AND N0A0" for the <PREV> column, and "LOGICAL_AND_NOT M18" for the <NEXT> column. If there is no previous, current, or next mnemonic and corresponding address, "NULL_PADDING" is added to the columns of <PREV>, <CURRENT>, or <NEXT> as space fillers so that all columns are filled before feature extraction module 304, shown in FIG. 3, further processes the data from FIG. 4C.

FIGS. 4D and 4E are exemplary products of feature engineering module 304, shown in FIG. 3. Feature engineering module 304 creates the tables found in FIGS. 4D and 4E. In FIG. 4D, the <PREV> OR <CURRENT> OR <NEXT> ADDRESS TYPE COUNTS columns count the number of times the letters N, M, A, O, and L are present in the addresses of the <PREV>, <CURRENT>, and <NEXT> columns of each row of FIG. 4C. The columns of letter counts are filled in for each row of FIG. 4D. The <PREV> OR <CURRENT> OR <NEXT> INSTRUCTION COUNTS columns count the number of times the instructions IF_NOT, LOGICAL_AND, LOGICAL_AND_NOT, OR_COMBINE, and OUPUT are present in the <PREV>, <CURRENT>, and <NEXT> columns of each row of FIG. 4C. In FIG. 4E, the BI-GRAM FEATURES <PREV><CURRENT>; <CURRENT><NEXT> columns count the number of times the combined instructions NULL_PADDING, IF_NOT_LOGICAL_AND, LOGICAL_AND_LOGICAL_AND, LOGICAL_AND_IF_NOT, IF_LOGICAL_OR, and IF_LOGICAL_AND are present in the combined instruction columns of <PREV> and <CURRENT> and <CURRENT> and <NEXT> of each row of FIG. 4C. For example, in FIG. 4C, the row for trigger 406 has a <PREV> instruction value of LOGICAL_AND and a <CURRENT> instruction value of LOGICAL_AND. Combined, the instructions read LOGICAL_AND_LOGICAL_AND. The <NEXT> instruction value for trigger 406 is IF_NOT, so the combined <CURRENT> and <NEXT> instruction values are LOGICAL_AND_IF_NOT. Therefore, in FIG. 4E, trigger 406 has one instance of LOGICAL_AND_LOGICAL_AND and one instance of LOGICAL_AND_IF_NOT. The bi-gram features columns are filled in for each row of FIG. 4E. The address counts, instruction counts, and bi-gram features are compared to training set 206, shown in FIG. 2, to determine if each component of chunk 400 is considered to be an alarm, a solenoid, or an error. The alarm, solenoid, and error determinations are combined in the COMMENT FEATURES column of FIG. 4E. The numbers of alarm references are added up in the ALM column. The numbers of solenoid references are added up in the SOL column, and errors are noted in the ER column. The comparisons to training set 206 to determine alarm references, solenoid references, and errors are carried out for each row.

FIG. 4F is an exemplary product of classification module 306. Classification module 306 uses the counts of feature engineering module 304, shown in FIGS. 4D and 4E, to classify the raw mnemonics shown in FIG. 4B. In FIG. 4F, the [TOP CLASS] column is in reference to the top-level classification, and the [SUB CLASS] column is in reference to the sub-level classification. Based on the COMMENT FEATURES columns of FIG. 4E, the top-level classification is ALARM CLASS because the ALM column is the only column of the COMMENT FEATURES columns to have counts in it. Based on the <PREV>, <CURRENT>, and <NEXT> features of FIGS. 4D and 4E, the sub-level classifications are made based on comparisons to training set 206.

FIG. 5A is a schematic diagram of another exemplary chunk 500 of a logic program including an alarm. Similar to chunk 400, chunk 500 includes two triggers for the alarm: trigger 502 and trigger 504. Chunk 500 also includes an alarm post-condition 506, an alarm output 508, an alarm latch 510 and an alarm reset 512.

Triggers 502 and 504 may include, for example, any combination of sensors and switches to enable the alarm. Trigger 502 is a negated input, e.g., a normally closed switch or button. Conversely, trigger 504 is a conventional logic input, e.g., an alarm button or a sensor that detects a physical condition associated with the alarm. Triggers 502 and 504 are arranged in series, which means each of the conditions must be met to actuate the alarm.

As in chunk 400, shown in FIG. 4A, alarm output 508 may include an audible alarm, such as, for example, a siren, a visual alarm, such as, for example, a light or beacon, or a communication that is initiated, such as, for example, transmitting an alarm signal to another computing system. Alarm output 508 may also include an actual solenoid or relay coil that is energized to actuate another alarm system. Alarm latch 510 is logically tied to alarm output 508. When alarm output 508 is actuated, alarm latch 510 latches around triggers 502 and 504. Alarm latch 510 ensures the alarm persists even if the conditions of triggers 502 and 504 are met only momentarily. For example, in a system where triggers 502 and 504 detect a fluid level exceeding a threshold, alarm output 508 is actuated and alarm latch 510 "seals-in" the conditions of triggers 502 and 504. Thus, if the fluid level drops below the alarm threshold, the alarm persists to alert other systems or operators to the occurrence of the fluid level exceeding the threshold.

Alarm latch 510 is broken by alarm reset 512. Alarm reset 512 may include a physical reset button or switch, or may include a digital reset that is engaged by another computing system.

Alarm post-condition 506 is arranged in series with triggers 502 and 504, and alarm output 508. Accordingly, alarm post-condition 506 must also be met to actuate the alarm. Notably, alarm post-condition 506 is not latched by alarm latch 510. Consequently, alarm post-condition 506 must be met as long as the alarm persists. Alarm post-condition 506 may include system-level validation logic to verify the alarm is valid. In the system example above, where the alarm guards against excessive fluid levels, alarm post-condition 506 may include a logical check that the system itself is even operating. In another example, alarm post-condition 506 may be a logical check that sensors or other inputs associated with triggers 502 and 504 are operating appropriately, calibrated, and not otherwise malfunctioning. In alternative embodiments, alarm post-condition 506 represents any other condition that should not be latched.

When chunk 500 is processed by classification module 306, classification module 306 recognizes the combination of triggers 502 and 504, for example, with alarm latch 510 and alarm reset 512 to classify chunk 500 as an alarm. The syntax of such an alarm is defined by alpha values assigned to each component. For example, triggers 502 and 504 are assigned the alpha value "T." Alarm latch 510 is assigned the alpha value "A," and alarm reset 512 is assigned the alpha value "R." Alarm post-condition 506 is assigned the alpha value "O," and alarm output 508 is assigned the alpha value "F." Accordingly, the syntax, or "grammar," of the alarm implemented in chunk 500 is "TTAROF."

FIG. 5B is an example graph of raw mnemonics from exemplary chunk 500 of the logic program including an alarm shown in FIG. 5A. As in FIG. 4B, the raw mnemonics are from logic repository 204 and include columns [PROGRAM OFFSET], [MNEMONIC], [ADDRESS], and [COMMENT]. As in FIG. 4B, if the mnemonics are for a specific component of chunk 500, the component is referenced on the left side of the row of mnemonics. Further, as in FIG. 4B, if there is no specific component of chunk 500 referenced, the component of chunk 500 is not specifically called out in chunk 500 and could be a junction of other components of chunk 500, for example. Columns [PROGRAM OFFSET], [MNEMONIC], [ADDRESS], and [COMMENT] refer to the same data that the columns do in FIG. 4B.

FIG. 5C is an exemplary product of segmentation module 302. Like as shown in FIG. 4C, segmentation module 302 segments the raw mnemonics, shown in FIG. 5B, into chunks and windows, as shown in the CHUNK/WINDOW column. The chunk number for chunk 500 is different than the chunk number for chunk 400, shown in FIG. 4C, because chunk 500 has a different "if" statement and output in its raw mnemonics, shown in FIG. 5B, than chunk 400 does. The ABS OFFSET, OFFSET OF <PREV>, OFFSET OF <CURRENT>, OFFSET OF <NEXT>, <PREV>, <CURRENT>, AND <NEXT> columns refer to the same data that the columns do in FIG. 4C, and the columns are populated using substantially the same method as described above for FIG. 4C. The difference between the methods is that the ABS OFFSET column does not start at zero, it starts at eight for FIG. 5C. The OFFSET OF <PREV>, OFFSET OF <CURRENT>, AND OFFSET OF <NEXT> columns refer to the offset of each row for chunk 500, not the order in which the raw mnemonics are read by the machine as a whole. To fill the OFFSET OF <PREY>, OFFSET OF <CURRENT>, and OFFSET OF <NEXT> columns, the ABS OFFSET value of eight is treated as a zero, nine is treated as a one, and the pattern continues until 14 is treated as a six, as shown in FIG. 5C. As FIG. 5C shows, for example, alarm latch 510 has an ABS OFFSET value of 10, so the OFFSET OF <CURRENT> value is 2. The OFFSET OF <PREY> value is 1, and the OFFSET OF <NEXT> value is 3. As FIG. 5B shows, the [MNEMONIC] for alarm latch 510 is IF, and its [ADDRESS] is A7321. The [MNEMONIC] for trigger 504 is LOGICAL_AND, and its [ADDRESS] is N712. The [MNEMONIC] for alarm reset 512 is LOGICAL_AND_NOT, and its [ADDRESS] is M18. Therefore, the <PREV>, <CURRENT>, and <NEXT> columns read LOGICAL_AND N712, IF A7321, and LOGICAL_AND_NOT M18, respectively, for the row of alarm latch 510.

FIGS. 5D and 5E are exemplary products of feature engineering module 304, shown in FIG. 3. Like as shown in FIGS. 4D and 4E and as described above, the columns for FIGS. 5D and 5E are populated in the same way. The <PREV> OR <CURRENT> OR <NEXT> ADDRESS TYPE COUNTS are populated by counting the number of times the letters N, M, A, O, and L are present in the address of each component of chunk 500. The <PREV> OR <CURRENT> OR <NEXT> INSTRUCTION COUNTS are populated by counting the number of times the mnemonics IF_NOT, LOGICAL_AND, LOGICAL_AND_NOT, OR_COMBINE, and OUTPUT are present for each component of chunk 500. The BI-GRAM FEATURES <PREV><CURRENT>; <CURRENT><NEXT> columns are populated by counting the number of times the combined mnemonics NULL_PADDING, IF_NOT LOGICAL_AND, LOGICAL_AND_LOGICAL_AND, LOGICAL_AND_IF_NOT, IF_LOGICAL_OR, and IF_LOGICAL_AND are present in the combined columns of <PREV> and <CURRENT> and <CURRENT> and <NEXT> in FIG. 5C. The address counts, instruction counts, and bi-gram features are compared to training set 206, shown in FIG. 2, to determine if each component of chunk 500 is considered to be an alarm, a solenoid, or an error. The alarm, solenoid, and error determinations are combined in the COMMENT FEATURES column of FIG. 5E. The numbers of alarm references are added up in the ALM column. The numbers of solenoid references are added up in the SOL column, and errors are noted in the ER column.

FIG. 5F is an exemplary product of classification module 306. Like as shown in FIG. 4F, classification module 306 uses the counts of feature engineering module 304, shown in FIGS. 5D and 5E to classify the raw mnemonics shown in FIG. 5B. The [TOP CLASS] and [SUB CLASS] columns refer to the same data as they do in FIG. 4F. As described above, based on the COMMENT FEATURES columns of FIG. 5E, the top-level classification is ALARM CLASS because the ALM column is the only column of the COMMENT FEATURES columns to have counts in it. Based on the <PREV>, <CURRENT>, and <NEXT> features of FIGS. 5D and 5E, the sub-level classifications are made based on comparisons to training set 206 .

FIG. 6A is a schematic diagram of yet another exemplary chunk 600 of a logic program including a solenoid. The solenoid is represented by a solenoid output 602. Solenoid output 602 may include a solenoid coil. In alternative embodiments, solenoid output 602 may include a relay coil that, when energized, applies power to the solenoid itself. In other embodiments, solenoid output 602 may include a digital output to a computing system that otherwise operates the solenoid.

Chunk 600 includes a solenoid post-condition 604 that must be met to actuate solenoid 602. Otherwise, chunk 600 includes four branches 606, 608, 610, and 612 of various conditions for actuating solenoid 602. Branch 606 includes conditions 614, 616, and 618 in series. Branch 608 includes a condition 620 as an alternate condition to condition 614 in branch 606. Branch 610 is an alternate to branches 606 and 608. Branch 610 includes conditions 622, 624, and 626. Branch 612 includes conditions 628, 630, and 632, and is an alternate branch to conditions 622 and 624.

When chunk 600 is processed by classification module 306, classification module 306 recognizes the combination of solenoid output 602 and the various branches 606, 608, 610, and 612 of conditions to classify chunk 600 as a solenoid. The syntax of such a solenoid is defined by alpha values assigned to each component. For example, conditions 614, 616, and 618 are assigned the alpha value "E." Likewise, condition 620 is assigned the alpha value "E." Conditions 622 and 624 are assigned the alpha value "U." Condition 626 is assigned the alpha value "V," and conditions 628, 630, and 632 are assigned the alpha value "M." Solenoid output 602 is assigned the alpha value "Y," and solenoid post-condition 604 is assigned the alpha value "0." Accordingly, the syntax, or "grammar," of the alarm implemented in chunk 600 is "EEEEUUMMMVOY."

FIG. 6B is an example graph of raw mnemonics from exemplary chunk 600 of the logic program including a solenoid shown in FIG. 6A. As in FIG. 4B, the raw mnemonics are from logic repository 204 and include columns [PROGRAM OFFSET], [MNEMONIC], [ADDRESS], and [COMMENT]. As in FIG. 4B, if the mnemonics are for a specific component of chunk 600, the component is referenced on the left side of the row of mnemonics. Further, as in FIG. 4B, if there is no specific component of chunk 600 referenced, the component of chunk 600 is not specifically called out in chunk 600 and could be a junction of other components of chunk 600, for example. Columns [PROGRAM OFFSET], [MNEMONIC], [ADDRESS], and [COMMENT] refer to the same data that the columns do in FIG. 4B.

FIG. 6C is an exemplary product of segmentation module 302. Like as shown in FIGS. 4C and 5C, segmentation module 302 segments the raw mnemonics, shown in FIG. 6B, into chunks and windows, as shown in the CHUNK/WINDOW column. The chunk number for chunk 600 is different than the chunk number for chunks 400 and 500, shown in FIGS. 4C and 5C, because chunk 600 has a different "if" statement and output in its raw mnemonics, shown in FIG. 6B, than chunks 400 and 500 do. The ABS OFFSET, OFFSET OF <PREV>, OFFSET OF <CURRENT>, OFFSET OF <NEXT>, <PREV>, <CURRENT>, AND <NEXT> columns refer to the same data that the columns do in FIGS. 4C and 5C, and the columns are populated using substantially the same method as described above for FIG. 5C. The OFFSET OF <PREV>, OFFSET OF <CURRENT>, AND OFFSET OF <NEXT> columns refer to the offset of each row for chunk 600, not the order in which the raw mnemonics are read by the machine as a whole. To fill the OFFSET OF <PREV>, OFFSET OF <CURRENT>, and OFFSET OF <NEXT> columns, like as described for FIG. 5C, the ABS OFFSET value of 15 is treated as a zero, 16 is treated as a one, and the pattern continues until 28 is treated as a 13, as shown in FIG. 6C. As FIG. 6C shows, for example, condition 628 has an ABS OFFSET value of 28, so the OFFSET OF <CURRENT> value is 6. The OFFSET OF <PREV> value is 5, and the OFFSET OF <NEXT> value is 7. As FIG. 6B shows, the [MNEMONIC] for condition 628 is IF, and its [ADDRESS] is L8. The [MNEMONIC] for condition 624 is LOGICAL AND, and its [ADDRESS] is L1801. The [MNEMONIC] for condition 630 is LOGICAL_AND, and its [ADDRESS] is M5023. Therefore, the <PREV>, <CURRENT>, and <NEXT> columns read LOGICAL_AND L1801, IF L8, and LOGICAL_AND M5023, respectively, for the row of condition 628.

FIGS. 6D and 6E are exemplary products of feature engineering module 304, shown in FIG. 3. Like as shown in FIGS. 4D, 4E, 5D, and 5E and as described above, the columns for FIGS. 6D and 6E are populated in the same way. The <PREV> OR <CURRENT> OR <NEXT> ADDRESS TYPE COUNTS are populated by counting the number of times the letters N, M, A, O, and L are present in the address of each component of chunk 600. The <PREV> OR <CURRENT> OR <NEXT> INSTRUCTION COUNTS are populated by counting the number of times the mnemonics IF_NOT, LOGICAL_AND, LOGICAL_AND_NOT, OR_COMBINE, and OUTPUT are present for each component of chunk 600. The BI-GRAM FEATURES <PREV><CURRENT>; <CURRENT><NEXT> columns are populated by counting the number of times the combined mnemonics NULL_PADDING, IF_NOT_LOGICAL_AND, LOGICAL_AND_LOGICAL_AND, LOGICA- L_AND_IF_NOT, IF_LOGICAL_OR, and IF_LOGICAL_AND are present in the combined columns of <PREV> and <CURRENT> and <CURRENT> and <NEXT> in FIG. 6C. The address counts, instruction counts, and bi-gram features are compared to training set 206, shown in FIG. 2, to determine if each component of chunk 600 is considered to be an alarm, a solenoid, or an error. The alarm, solenoid, and error determinations are combined in the COMMENT FEATURES column of FIG. 6E. The numbers of alarm references are added up in the ALM column. The numbers of solenoid references are added up in the SOL column, and errors are noted in the ER column.

FIG. 6F is an exemplary product of classification module 306. Like as shown in FIGS. 4F and 5F, classification module 306 uses the counts of feature engineering module 304, shown in FIGS. 6D and 6E, to classify the raw mnemonics shown in FIG. 6B. The [TOP CLASS] and [SUB CLASS] columns refer to the same data as they do in FIG. 4F. As described above, based on the COMMENT FEATURES columns of FIG. 6E, the top-level classification is SOLENOID CLASS because the SOL column is the only column of the COMMENT FEATURES columns to have counts in it. Based on the <PREV>, <CURRENT>, and <NEXT> features of FIGS. 6D and 6E, the sub-level classifications are made based on comparisons to training set 206.

Figure 7:
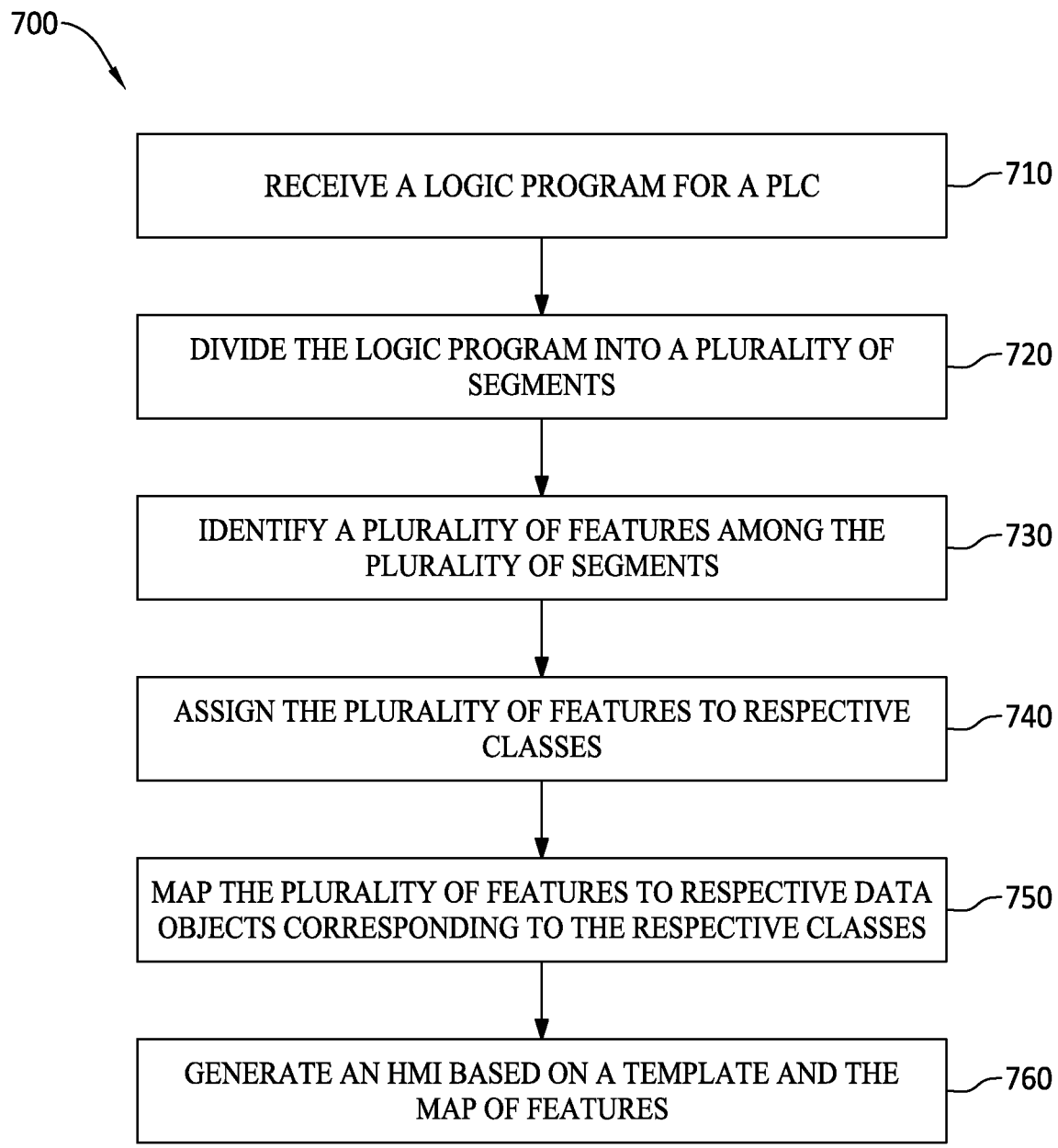
FIG. 7 is a flow diagram of an exemplary method of generating a human-machine interface (HMI) for the PLC shown in FIGS. 1 and 2.

FIG. 7 is a flow diagram of an exemplary method 700 of generating an HMI for PLC 102, shown in FIGS. 1 and 2. The logic program for PLC 102 is received 710 from logic repository 204 at analysis system 108 and, more specifically, processor 112. Processor 112 executes segmentation module 302 to divide 720 the logic program into a plurality of segments. The segments of the logic program organize the logic elements into a hierarchical format for subsequent processing. Processor 112 and, more specifically, segmentation module 302 utilize the model generated from training set 206, shown in FIG. 2, to define the various boundaries of the segments and chunks of the logic program. Such definitions, in certain embodiments, are defined automatically. In alternative embodiments, such definitions are set manually by a user.

Processor 112 executes feature extraction module 304 to process the plurality of segments of the logic program to identify 730 a plurality of features among the plurality of segments. Features may include, for example, and without limitation, instructional arrangements, inputs, outputs, and/or specific memory arrangements. Processor 112 and, more specifically, feature extraction module 304 utilize the model generated from training set 206 to detect coincidence of particular features to be recognized in the logic program and to group the particular features. Processor 112 executes classification module 306 to assign 740 respective classifications to the features based on the model and training set 206. Classification module 306 is configured to detect groups of coincident features and to assign such groups to a class. For example, a class, such as an alarm, may include features such as a timer, a reset, and a latch. Classification module 306 detects coincident occurrences of such a timer, a reset, and a latch, and then assigns those features to the class for an alarm.

In certain embodiments, method 700 includes executing grammar verification module 308 to verify syntactical details of the respective classifications.

Processor 112 executes object notation module 310 to map 750 the plurality of features to respective data objects corresponding to the respective classifications based on the model and training set 206. The respective data objects are object-oriented hierarchical representations of the features, such as, for example, Java Script Object Notation (JSON). Processor 112 is configured to write the data objects to analysis result repository 208. In certain embodiments, analysis result repository 208 is formatted as a database configured to be accessed by analysis system 108, HMI device 118, and other computing systems coupled to PLC system 100.

Referring again to PLC system 100, shown in FIGS. 1 and 2, HMI device 118 is configured to gain access to analysis result repository 208 to generate 760 an HMI based on the mapping 750 of the features and respective classifications to the data objects defined by the model generated based on the training set 206. HMI device 118 is further configured to generate the HMI based on a template. The template includes, for example, a predetermined graphical presentation of the features and classifications of the logic program. The template defines the manner in which the HMI is displayed and the manner with which users interact with the HMI and the features of the logic program. HMI device 118 is coupled to PLC 102 by a real-time communication interface 210, such as, for example, a serial channel or Ethernet. Real-time communication interface 210 enables HMI device 118 to gain access to real-time data of the logic program executing on PLC 102 and, more specifically, real-time data of the features and logic elements of the logic program. In alternative embodiments, a network-based cache of the memory of PLC 102 may be used in lieu of a direct connection. HMI device 118 enables a user to view and interact with PLC 102 in real-time.

The above described embodiments provide a system and method for analyzing ladder logic to generate HMI representations for programming PLCs. The system generates HMI displays for organizing conditions, logic elements, inputs, outputs, and memory addresses, for example. The system described herein analyzes the logic program loaded onto the PLC to learn and model the logic elements of the logic program. The system further analyzes the logic program to segment the logic program, identify features, classify the features according to the model, and map the resultant top and subordinate classifications to corresponding data objects that are exported to a maintenance system for inclusion in the HMI.

An exemplary technical effect of the methods, systems, and apparatus described herein includes at least one of: (a) reducing time and cost of PLC maintenance; (b) automatically incorporating additional features and modifications of existing features of a logic program into peripheral systems; (c) automatically generating HMI based on logic programs programmed onto a PLC; and (d) generating models for analyzing logic programs used in PLC systems, including, for example, ladder logic.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above examples are exemplary only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An analysis system for a logic program for a programmable logic controller (PLC), said analysis system comprising:
   a non-transitory memory; and
   a processor configured to:
      receive the logic program,
      divide the logic program into a plurality of segments,
      identify a plurality of features among the plurality of segments,
      assign the plurality of features to respective classes,
      map the respective classes to respective data objects corresponding to the respective classes, and
      write the respective data objects to said non-transitory memory.

2. The analysis system of claim 1, wherein said processor is further configured to divide the logic program into hierarchical segments, chunks and windows.

3. The analysis system of claim 1, wherein said processor is further configured to identify at least one alarm among the plurality of features.

4. The analysis system of claim 1, wherein said processor is further configured to verify syntax of the plurality of features assigned to the respective classes.

5. The analysis system of claim 1, wherein the respective classes include at least one high level class and at least one subordinate class.

6. The analysis system of claim 1, wherein said processor is further configured to map the plurality of features to the respective data objects.

7. The analysis system of claim 1 further comprising a display configured to display an HMI for the PLC, wherein said processor is further configured to generate the HMI based on the respective data objects.

8. A method of generating a human-machine interface (HMI) for a programmable logic controller (PLC), said method comprising:

receiving a logic program for the PLC;

dividing the logic program in a plurality of segments;

identifying a plurality of features among the plurality of segments;

assigning the plurality of features to respective classes;

mapping the respective classes to respective data objects; and generating an HMI based on a template and the mapping of the respective classes.

9. The method of claim 8, wherein receiving the logic program includes backing up the logic program from the PLC to a non-transitory memory and retrieving the logic program over a communication interface.

10. The method of claim 9, wherein receiving the logic program further comprises receiving the logic program over the communication interface at an analysis system.

11. The method of claim 8 further comprising generating a model of the logic program to define boundaries of the plurality of segments and types of the respective classes.

12. The method of claim 8 further comprising verifying syntax of the plurality of features assigned to the respective classes.

13. The method of claim 8, wherein the respective classes include at least one high level class and at least one subordinate class.

14. The method of claim 8 further comprising mapping the plurality of features to the respective data objects.

15. The method of claim 8, wherein generating the HMI comprises gaining access, by an HMI device, to the mapping of the respective data objects and generating graphics presenting the data objects based on the template.

16. The method of claim 8, wherein assigning the plurality of features to the respective classes comprises:

detecting a group of coincident features among the plurality of features; and assigning the group of coincident features to a corresponding class.

17. A system for generating a human-machine interface (HMI) for a programmable logic controller (PLC), said system comprising:

an analysis system configured to generate a map of features of a logic program for the PLC; and an HMI device coupled to said analysis system and configured to:

receive the map of features; and generate the HMI based on a template and the map of features.

18. The system of claim 17, wherein said analysis system comprises a processor configured to:

receive the logic program;

divide the logic program into a plurality of segments;

identify the features among the plurality of segments;

assign the features to respective classes;

map the respective classes to respective data objects corresponding to the respective classes; and write the respective data objects to a non-transitory memory.

19. The system of claim 18, wherein said HMI device is further configured to gain access to the map of features stored on the non-transitory memory.

20. The system of claim 18, wherein said processor is further configured to verify syntax of the features assigned to the respective classes.

* * * * *